United States Patent [19]

Williams

[11] Patent Number: 5,445,269
[45] Date of Patent: Aug. 29, 1995

[54] MEDIA STORAGE BIN

[75] Inventor: Arthur Williams, New York, N.Y.

[73] Assignees: Charles L. Freedman, New York; Mark Polyocan, Great Neck; Arthur J. Williams, New York, all of N.Y.

[21] Appl. No.: 134,618

[22] Filed: Oct. 12, 1993

[51] Int. Cl.⁶ ............... B65D 85/00; B65D 85/30; B65D 85/62
[52] U.S. Cl. ............... 206/425; 206/503; 206/509
[58] Field of Search ............ 206/425, 444, 503, 508, 206/509, 561, 564

[56] References Cited

U.S. PATENT DOCUMENTS

| | | | |
|---|---|---|---|
| 864,761 | 8/1907 | Erickson | 206/509 |
| 1,173,002 | 2/1916 | Kennedy | 206/425 |
| 2,701,635 | 2/1955 | Mills | 206/425 |
| 3,182,856 | 5/1965 | Goltz | 206/509 |
| 3,252,614 | 5/1966 | Evans | 206/509 |
| 3,347,394 | 10/1967 | Gould | 206/509 |
| 4,015,713 | 4/1977 | Clipson et al. | 206/509 |
| 4,118,084 | 10/1978 | Sussman | 206/509 |
| 4,372,444 | 2/1983 | LeGrand et al. | 206/509 |
| 5,002,215 | 3/1991 | Gregoire | 206/425 |
| 5,201,414 | 4/1993 | Kaszubinski | 206/444 |

Primary Examiner—Paul T. Sewell
Assistant Examiner—Marie Denise Patterson
Attorney, Agent, or Firm—Levine & Mandelbaum

[57] ABSTRACT

A storage bin for compact discs in their native crystal boxes has an open top to permit viewing of the labels through the edges of the boxes, a forward sloping front wall to enable the boxes to be flipped for viewing the faces of the boxes, a guide extending downwardly from the base of the box dimensioned to be slidably received between the side walls of a like box so that the boxes can be stacked and slid with respect to one another, and an integral extension of the base for supporting a handle and a label frame. An optional divider partitions the bin to store two rows of tape cassettes.

2 Claims, 2 Drawing Sheets

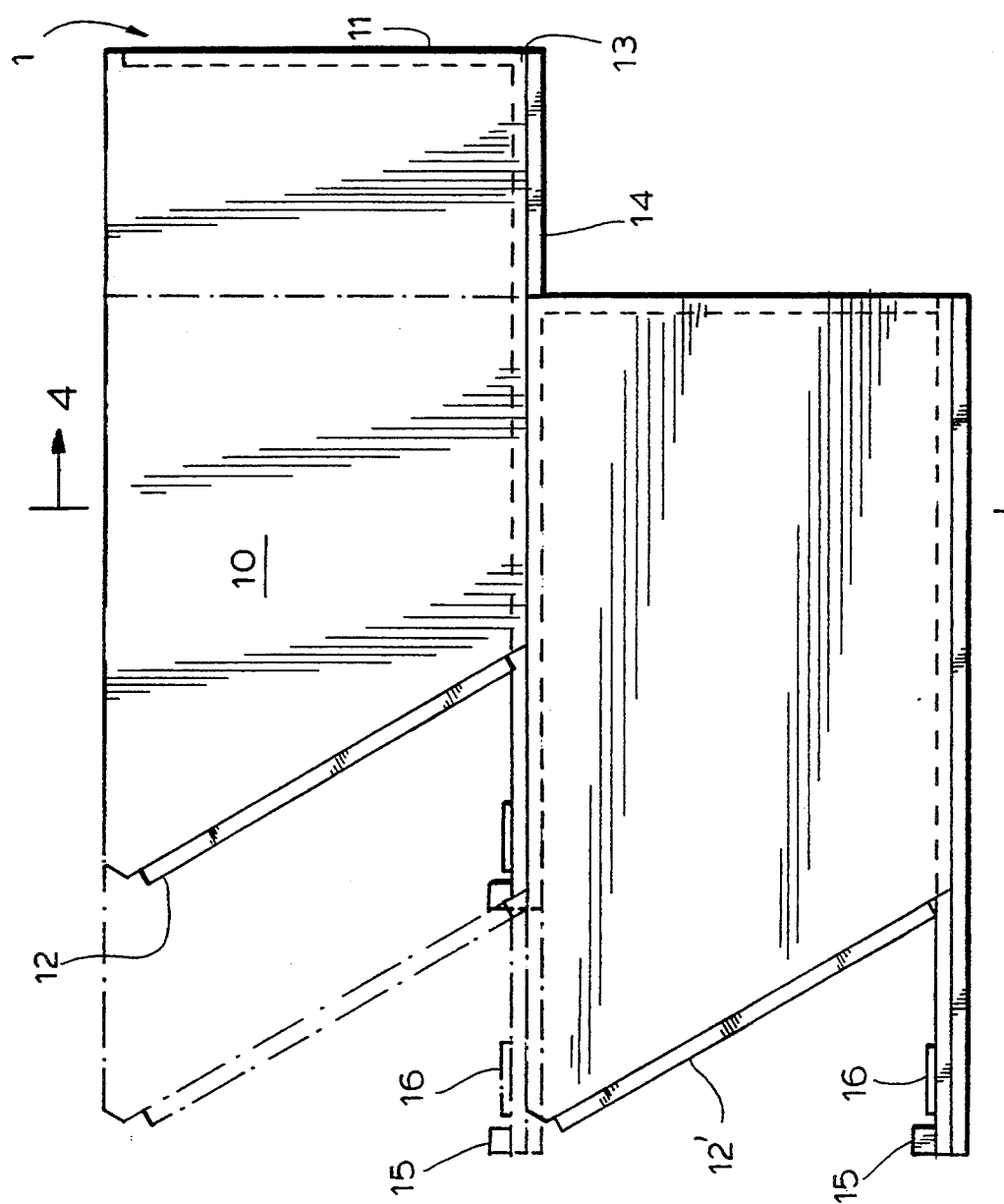
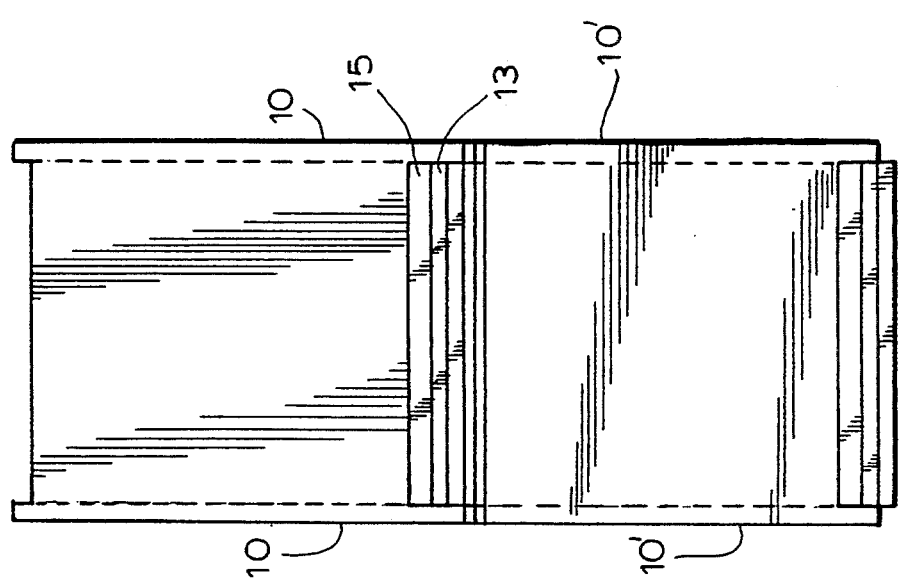

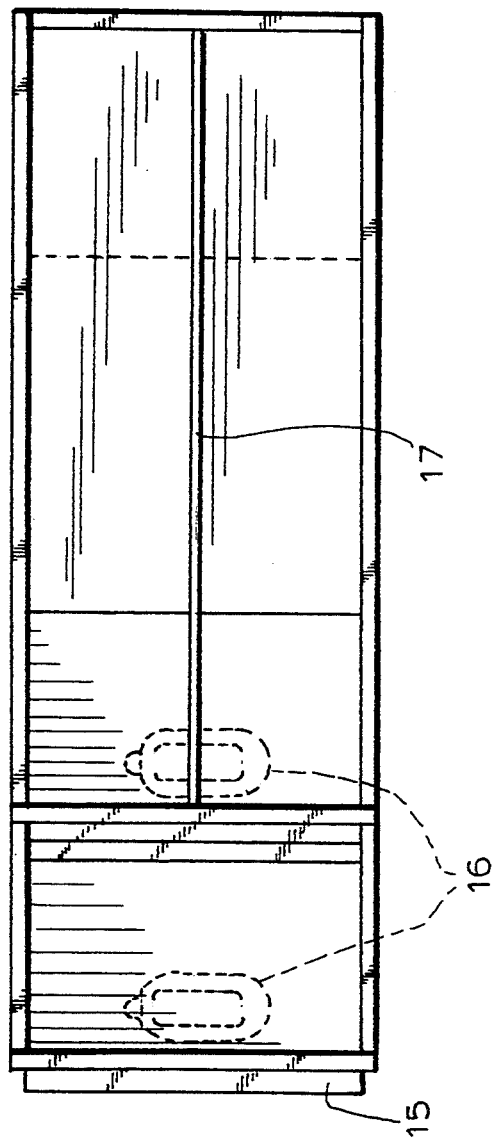
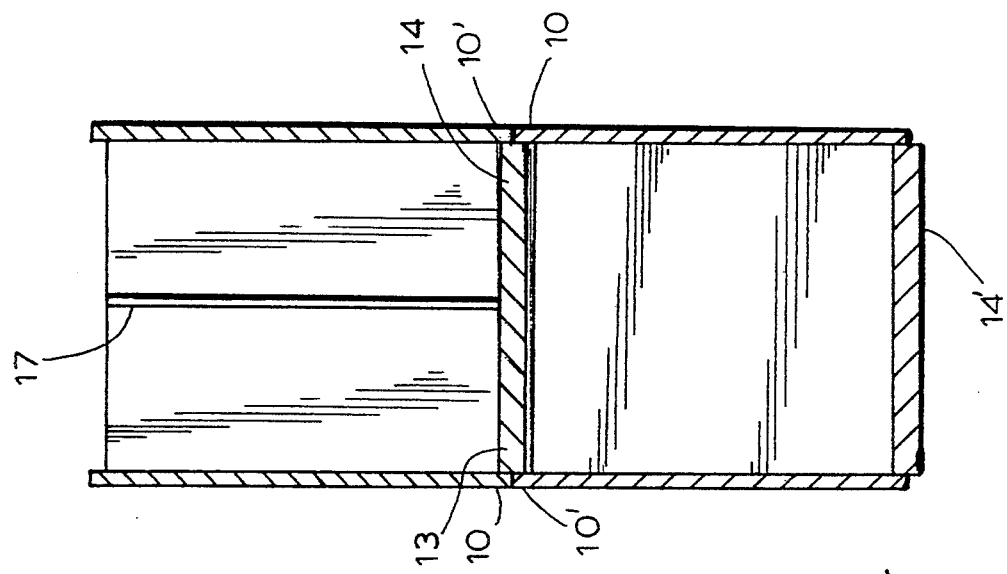
FIG. 3
FIG. 4

MEDIA STORAGE BIN

BACKGROUND OF THE INVENTION

This invention provides for the storage of compact discs, which come packed in square "crystal" boxes and, optionally, audio tape cassettes in their boxes, in stackable bins. More specifically, the invention is directed to stackable bins which enable compact diskettes and tape cassettes to be stored in their native crystal boxes while providing good visibility of the labels on the edges of the boxes from which the audio material recorded on the discs and cassettes can be readily identified.

It is known in the art of media storage to provide a container for receiving compact discs or computer diskettes. Such containers often require internal subcontainers or assemblies to hold the discs. Others must employ covers to enable stacking of the containers. Moreover, prior art containers do not provide for manipulating them with respect to one another to provide easy viewing of, and access to, their contents. Most storage racks which are available to consumers for holding their compact discs hold the discs so that only the narrow edges of the crystal boxes can be seen. This makes it difficult to read the title of the discs contained in the boxes. In addition, conventional storage racks have a depth about equal to the width of a compact disc box. Hence, when such racks are placed on a typical 12 inch deep bookshelf, the space behind the rack is wasted.

For example, U.S. Pat. No. 5,201,414 discloses a compact disc storage container having a forwardly angled front wall so as to permit compact discs stored in the container to be flipped forwardly. However, the container cannot hold crystal boxes as it provides U-shaped holders for the compact discs themselves, rather than the crystal boxes. Also, this storage container requires a cover so that the containers can be stacked one upon another. There is no suggestion of a handle to allow for convenient handling of the container and provide a surface for accommodating a label to indicate the subject of the compact discs stored in the container. There is also no suggestion of an optional central partition to provide compartments for storing audio tape cassette boxes.

U.S. Pat. No. 5,027,950 illustrates a storage container for holding various types of discs, including compact discs. The container carries pivotally mounted holders each of which can accommodate the bottom edge of a compact disc box. Because the holders are pivotally mounted, the compact disc boxes can be flipped forwardly to expose the face of each one. However, these holders cannot be stacked upon one another, nor is a forwardly projecting handle provided.

U.S. Pat. No. 4,588,086 teaches the construction of a carrier for computer hard discs. The carrier includes a tray and cover, and like carriers can be stacked one upon another. However, this carrier does not permit flipping through the discs to see their faces. Similarly, U.S. Pat. No. 5,046,615 which relates to a carrier and shipping container for computer hard discs does not allow flipping through the discs to see their faces.

U.S. Pat. No. 4,684,019 relates to a storage container for computer diskettes. The storage container holds a series of individual pivotally mounted containers each of which can be rotated forwardly to simplify removing and replacing diskettes within the pivotal containers. The floor of each pivoted container has a stepped configuration so that labels along the upper edges of all the diskettes in the container can be viewed simultaneously. This storage container requires a cover to permit like containers to be stacked one upon another.

U.S. Pat. No. 4,676,372 is directed to a storage container for computer diskettes. This storage container is constructed to hold two side-by-side rows of diskettes. However, there is no suggestion that the central partition is removable so that the container can hold items of larger size. The storage container is provided with a cover which can be pivoted rearwardly to serve as a support for holding the container in an easel-like manner. U.S. Pat. No. 4,776,457 shows a similar storage container.

Finally, U.S. Pat. No. 4,776,463 discloses a diskette storage container having individual wallet-like holders for diskettes. The bottom wall of the container has a stepped configuration so that the upper edges of all the diskette holders can be viewed simultaneously. However, this container does not provide the combination of features necessary for convenient and flexible storage, viewing and handling of compact discs and tape cassettes.

SUMMARY OF THE INVENTION

The storage rack of the invention overcomes the problems mentioned above and permits the full face of a compact disc box to be seen while all the compact discs remain in the storage container. In addition, the container can be twelve inches long to take advantage of the full depth of a typical shelf. The invention provides for a media storage bin comprising a base having a first track means, two parallel spaced side walls extending upwardly from opposite sides of the base, a rear wall extending upwardly from the rear of the base and transversely spanning the side walls, an inclined front wall extending upwardly and forwardly from the front of the base and transversely spanning the side walls, the first track means including a guide extending downwardly from the base beyond the bottom edges of the side walls, the guide having a width slightly less than the distance between the side walls for being received between them, and second track means including the top edges of the side walls, the side walls extending upwardly beyond at least one of the top edges of the front and rear walls, for permitting relative longitudinal movement and preventing relative lateral movement between stacked bins, and an extension of the base which includes a handle for grasping the bin and a frame adapted to receive a label for identifying the contents of the bin. The distance between the first and second side walls is slightly greater than the width of a standard compact disc box and the height of the first and second side walls is slightly greater than the height of the standard compact disc box. Each bin can have a removable partition wall extending upwardly from the longitudinal axis of the base in parallel equidistant relationship to the side walls with the distances between the partition wall and each of the side walls being slightly less than the width of a standard tape cassette box.

It is therefore an object of the invention to provide a media storage bin which enables compact diskettes and tape cassettes to be stored in their native boxes while providing good visibility of the labels on the edges of the boxes by which the audio material recorded on the discs and cassettes can be readily identified.

Another object of the invention is to provide a media storage bin which does not require internal subcontainers or assemblies to hold discs or cassettes.

Still another object of the invention is to provide media storage bins which can be stacked without covers and reciprocated with respect to one another.

A further object of the invention is to provide a media storage bin in which compact discs and tape cassettes can be flipped for viewing of indicia on their faces.

Still a further object of the invention is to provide a media storage bin deep enough to exploit the full depth of a standard shelf.

Other and further objects of the invention will be apparent from the following drawings and description of a preferred embodiment of the invention in which like reference numerals are used to indicate like parts in the various views.

DESCRIPTION OF THE DRAWINGS

FIG. 1 is a side elevation view of the apparatus of the invention showing in one disposition with another disposition shown in phantom.

FIG. 2 is a front elevation view of the apparatus of the invention shown in FIG. 1.

FIG. 3 is top plan view of the apparatus of the invention shown in FIG. 1.

FIG. 4 is cross-sectional elevation view of the apparatus of the invention shown in FIG. 1.

DESCRIPTION OF THE PREFERRED EMBODIMENT

Referring now to FIGS. 1-4 of the drawings, a media storage bin or container 1 is stacked upon an identical bin 1'. Each of the bins 1 and 1' includes two vertical side walls 10, 10' a vertical back wall 11, 11', and a forwardly slanted front wall 12, 12'. The side walls 10, 10' are taller than at least one, and preferably both, of the front and rear walls 12, 12' and 11, 11', respectively. A base 13, 13' has an upper surface which forms the floor of the interior of the bin 1, 1' and upon which compact disc boxes can be stood on end.

An extension 14, 14' of the base 13, 13' protrudes downwardly from its bottom and has a rear edge substantially flush with the rear edge of the top of base 13, 13', and side edges coextensive with the interior surfaces of the walls 10, 10'. The downward extension 14, 14' of the base 13, 13' serves as a guide slidable between the upper margins of the side walls 10'', 10 of the bins 1', 1, i.e., the width of each guide 14, 14' is substantially equal to the distance between side walls 10, 10'.

The base 13, 13' extends forwardly beyond the lower end of front wall 12, 12' with its forward edge in substantial vertical alignment with the top edge of the front wall 12, 12'. The front edge of the guide 14, 14' is coextensive with the front edge of the base 13, 13'. The top surface of the forward extension of the base 13, 13'', adjacent is front edge, is provided with a handle 15, 15'. The handle 15, 15' facilitates picking up the storage bin 1, 1' with one hand.

The depth of the base 13 of the storage bin 1, 1', measured from to back, is preferably about 13 inches, two inches of which extends forward of the storage chamber defined by the walls 10,11,12, 10',11',12'. The floor of the chamber is about 11 inches deep and accommodates approximately 25 compact disc boxes. The storage container 1, 1' can be amply supported by, and slightly extends over, a conventional 12 inch deep shelf which ordinarily holds books or long playing records. In this way, the full depth of the shelf can be utilized for storage of compact discs.

The angled front wall 12 permits the compact discs to be flipped forwardly, i.e., pivoted about their bottom edges, one-by-one so that the full face of each compact disc box in the storage container can be viewed. In this way, the user can readily see the full front face of each compact disc box, rather than only the thin edge of the box.

The storage containers 1 are designed to be stacked, one upon another, as shown in FIGS. 1, 2 and 4. The guide 14, 14' which extends downwardly below the bottom edges of side walls 10, 10' is provided for this purpose. As best seen in FIG. 4, when stacked, the bottom edges of side walls 10 of the upper container 1 rest upon the upper edges of side walls 10' of the lower container 1', and the downwardly projecting guide 14 of the base 13 fits between the upper margins of the side walls 10' of the lower container 1'. When access to the compact discs in the lower container 1' is desired, handle 15 of the upper container 1 is grasped and the upper container 1 is lifted, or slid forwardly, off the lower container 1'. The lower container 1 is then removed from the shelf by grasping its handle 15' with the other hand, and the positions of the two containers can be reversed.

Alternatively, if limited access to the lower container 1' is sufficient, the lower container 1' can be pulled forwardly and/or the upper container 1 can be pushed rearwardly (provided the upper margins of the side walls 10' extend above the rear wall 11') to gain access to the contents in the front of bin 1', or the lower container 1' can be pushed rearwardly and/or the upper container 1 can be pulled forwardly (provided the upper margins of the side walls 10' extend above the front wall 12'), to gain access to the contents in the rear of bin 1'.

A frame 16, 16' may be provided on the upper surface of the forward extension of the base 13, to accommodate a label or other substrate bearing indicia identifying the contents of each respective container.

As shown in FIGS. 3 and 4, a removable partition 17 may be located along the center line of the container 1, such as by slipping it into centrally disposed slots in the back and front walls 11 and 12. The partition 17 divides the interior of the bin 1 into two chambers in which two respective columns of audio tape cassette boxes can be stored on end.

As seen from the foregoing description, the media storage bin 1 of the invention is an elongated container having an interior width slightly wider than the face of a "crystal" box which holds a compact disc, i.e., approximately 5¾ inches. The front wall 12 of the container is angled forwardly so that the compact disc boxes stored in the container can be flipped forwardly to expose the face of each disc box. In addition, the storage container has no covers. Like containers can be stacked one upon another. An upper container 1 can be slid forwardly along a lower container 1' to provide access to the discs in the lower container 1' or the positions of the containers can be reversed, i.e., the container 1' can be stacked atop the container 1. The bottom of the angled front wall 12, 12' is spaced rearwardly of the frontal extension the base 13, 13' of the container 1, 1' so as to provide for a handle 15, 15' whereby the containers 1 and 1' can be reciprocated relative to one another, lifted, and otherwise manipulated. Each container 1, 1' is preferably about twelve inches long so that it occupies the full depth of a book or phonograph record shelf. Optionally a dividing wall 17 can be provided along the longitudinal axis or centerline of the container to divide the interior into two compartments for holding two rows of audio tape cassette boxes.

It is to be appreciated that the foregoing is a description of a preferred embodiment of the invention to which variations and modifications may be made without departing from the spirit and scope of the invention.

What is claimed is:

1. A media storage bin comprising
   a rectangular base having two sides, a front, a rear, a longitudinal axis along a center line running from said front to said rear, and an upper surface;
   two parallel spaced side walls extending upwardly from opposite sides of said base and having bottom edges proximate said base, top edges distal from said base, and interior planar surfaces;
   a rear wall extending upwardly from the rear of said base and transversely spanning said side walls;
   an inclined front wall extending upwardly and forwardly from the front of said base and transversely spanning said side walls;
   said side walls extending upwardly beyond at least one of the top edges of said front and rear walls, and
   projection means extending downwardly from the base beyond the bottom edges of said side walls and having side edges coextensive with the interior surfaces of said side walls, said projection means extending beyond the front of said base and comprising a handle for grasping said bin.

2. A media storage bin in accordance with claim 1 wherein a portion of said projection means extending beyond the front of said base comprises a frame mounted on the upper surface thereof for receiving a label for identifying the contents of said bin.

* * * * *